(No Model.)

A. J. WALKER.
SPRING HORSESHOE.

No. 542,546.  Patented July 9, 1895.

WITNESSES:
John A. Rennie

INVENTOR
A. J. Walker
BY Munn & Co.
ATTORNEYS.

UNITED STATES PATENT OFFICE.

ALBERT JAMES WALKER, OF JACKSONVILLE, FLORIDA.

SPRING-HORSESHOE.

SPECIFICATION forming part of Letters Patent No. 542,546, dated July 9, 1895.

Application filed December 10, 1894. Serial No. 531,404. (No model.)

*To all whom it may concern:*

Be it known that I, ALBERT JAMES WALKER, of Jacksonville, in the county of Duval and State of Florida, have invented a new and Improved Horseshoe, of which the following is a full, clear, and exact description.

The object of the invention is to provide a new and improved horseshoe which is simple and durable in construction and arranged to permit the animal's hoof to readily expand and contract, to allow the animal to fully develop his gait without hinderance or danger of soreness.

The invention consists principally of a bridge connecting the toe ends of the sides with each other.

The invention also consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
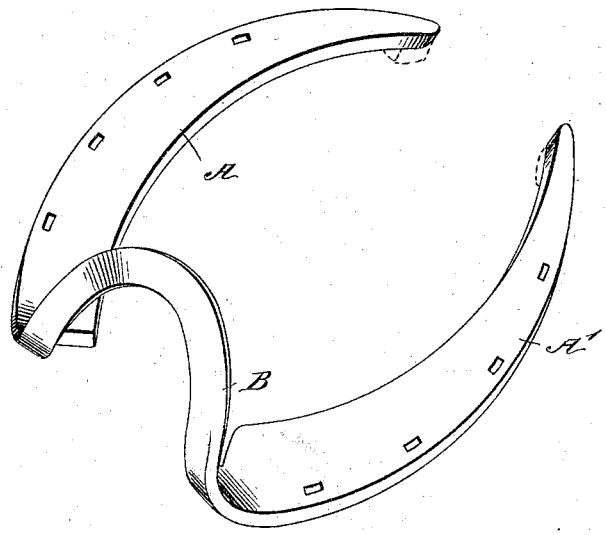
Figure 2:
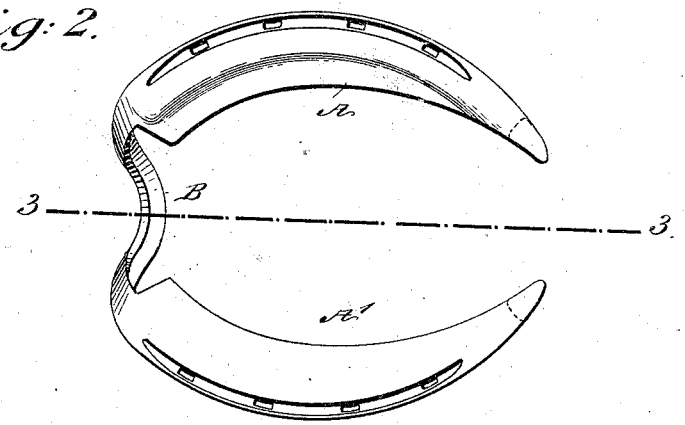
Figure 3:
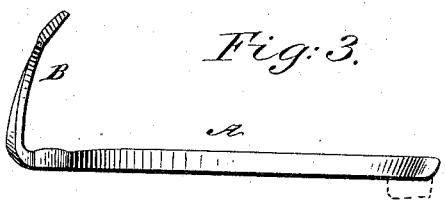

Figure 1 is a perspective view of the improvement. Fig. 2 is an inverted plan view of the same, and Fig. 3 is a sectional side elevation of the improvement.

The improved horseshoe is provided with sides A and A', connected with each other at their toe ends by an arched elastic bridge-piece B, integral with the sides and bent up rearwardly in an angular direction so as to fit onto the front surface of the hoof of the animal, the lower edge of said bridge-piece being arched upwardly above the lower edges of the side portions A and A' of the shoe. The sides A and A' are provided with the usual apertures for the passage of the nails to fasten the shoe in place on the animal's hoof.

It will be seen that by the arrangement described the sides A and A' are spaced apart at the heel and toe ends, as is illustrated in Fig. 1, it being understood, however, that the degree of opening at the ends of the sides A and A' depends on the shape and form of the animal's hoof.

The bridge-piece B permits the sides A and A' to give sufficiently in a lateral direction to accommodate the sides to the expansion and contraction of the hoof as the animal steps on the ground or lifts his foot. It is well known that when an animal sets his foot on the ground in walking or running it naturally expands the hoof by the weight of its body, and when the hoof is lifted off the ground the hoof naturally contracts. Now as the sides A and A' are open at both ends they can readily give sufficiently, according to the expansion or contraction of the hoof. Hence the animal can readily develop his gait without hinderance or danger of soreness.

The bridge-piece B is made flat to fit snugly on the surface of the hoof, and by being arched, as shown in the drawings, it will readily give sufficiently to permit the toe ends of the sides A and A' to move toward and from each other.

Having thus fully described my invention, I claim as new and desire to secure by Letters Patent—

A horseshoe consisting of side portions and an elastic bridge-piece connecting the forward ends of said side portions, said bridge-piece being bent up rearwardly at an angle to the said side portions and having its lower edge above the same, substantially as set forth.

ALBERT JAMES WALKER.

Witnesses:
GEO. EMERY,
H. J. GENTH, Jr.